Patented Nov. 17, 1942

2,302,462

UNITED STATES PATENT OFFICE 2,302,462

PROCESS OF PREPARING CUMIC ACID

Robert C. Palmer and Carlisle H. Bibb, Pensacola, Fla., assignors to Newport Industries, Inc., Pensacola, Fla., a corporation of Delaware No Drawing. Application November 6, 1939, Serial No. 303,026

9 Claims. (Cl. 260—524)

This invention relates to a process of preparing cumic acid, and more particularly to the preparation of cumic acid from a cymene by catalytic oxidation of the methyl group.

It has heretofore been proposed, as in the Binapfl Patent No. 1,813,606, to effect the catalytic oxidation of an alkyl side chain containing at least 2 carbon atoms, but according to that patent the oxidation is limited to the alpha carbon atom of the side chain, with the formation of either a secondary or tertiary alcohol, depending upon whether or not the chain is branched, and a ketone.

Also, the article by Senseman and Stubbs, Journal of Industrial and Engineering Chemistry, vol. 24, page 1184, dated October 1932, describes the oxidation of the isopropyl group on cymene. By the method of that article, the formation of an acid is restricted to the conversion of the group containing at least 2 carbon atoms, while the methyl group remains unaffected. Toluic acid is thus the product of the Senseman and Stubbs process as applied to cymene. Since the process used by Senseman and Stubbs practically parallels the process of Binapfl, except as to the type of hydrocarbon and temperature used, the teachings of both Senseman and Stubbs and of Binapfl would lead one skilled in the art to believe that there is no practical method of oxidation in the liquid phase that would result in the selective oxidation of a methyl group occurring as a substituent on a benzenoid ring in the presence of a side chain containing a plurality of carbon atoms. This conclusion would appear the more logical since it is a known general fact that such complex side chains are much more easily oxidized than the methyl group itself.

We have, however, discovered, most surprisingly, that cymene can readily be oxidized to cumic acid, and not to toluic acid, and that the process can be carried out in an efficient and highly practical manner. We accomplish this by the use of an oxidation catalyst that is sufficiently selective in its oxidizing catalytic effect, within certain limiting temperature ranges, to oxidize the methyl group on cymene to a carboxyl group in substantial yields.

It is therefore an important object of this invention to provide a process for the catalytic oxidation of cymene to produce cumic acid.

Other and further important objects of this invention will become apparent from the following description and appended claims.

The catalysts that we have found to be most satisfactory for our purpose are the oxygen containing compounds of the so-called heavy metals, particularly of such metals as manganese, cobalt, lead, iron, nickel, copper, vanadium, chromium and mercury. The oxides, hydroxides, or organic salts of any of these metals, or combinations thereof, may be employed. For instance, heavy metal compounds of any of the acids, such as acetic acid, belonging to the lower fatty acid series, have been found particularly suitable. Cumates of the heavy metals have likewise been found satisfactory.

The following will serve as an example of one method of preparing a preferred catalyst comprising a mixture of manganese and lead acetate:

A mixture of manganese acetate containing 4 moles of water with lead acetate containing 3 moles of water is intimately ground and fused at about 130° C. until the product becomes anhydrous and solid. The mixture should be held at this temperature, preferably, until a slight brown discoloration appears. The solid mixture is then cooled in a dry atmosphere and ground to a fine powder. The catalytic activity of the mixture is not critical as regards the proportion of manganese to lead, but 2 parts of manganese acetate to 1 part of lead acetate have been found to be very satisfactory.

The following example will serve to illustrate a preferred embodiment of our process for preparing cumic acid from cymene:

200 gallons of cymene are placed in a suitable vessel equipped with heating, cooling and agitating means, as well as a pipe or conduit leading down into the cymene for the introduction of air thereinto. 30 lbs., corresponding roughly with 2% by weight, of catalyst are added and the temperature raised to about 45° C. and held at that temperature for about 2 hours. Air is introduced into the charge of cymene at the rate of about 17 cu. ft. per minute, while at the same time agitating the charge vigorously. After the 2 hour period, the temperature can be brought down to 30° C. and the process continued for an additional period of about 72 hours. The degree of oxidation taking place can be followed by determining the specific gravity of the product. The specific gravity may be allowed to increase from 0.861 for cymene itself, to 0.994 for a mixture of cymene, cumic acid and other side reaction products. At the latter specific gravity, the crude oxidized cymene reaction mass will be found to contain about 20% of its weight as cumic acid, the balance being some other oxidation products of cymene, such as tolyl methyl carbinol and para-methyl-acetophenone, and unreacted cymene.

The yield of cumic acid on the basis of the cymene consumed in the oxidation process will amount to about 40%.

The resulting crude reaction mass, having a volume of about 190 gallons, is washed once with a slight excess of dilute hydrochloric acid, such as an amount of 6% hydrochloric acid sufficient to react with the metal compounds present and effect their removal from the crude reaction mass. This step is preferred, but not essential, for the purpose of putting the resulting crude reaction mass in a condition which will not cause emulsions to persist when it is subsequently washed with alkali to separate the cumic acid.

The crude reaction mass is then given a water wash of about 200 gallons to remove the remaining chlorides. It is finally washed once with a slight excess (based on the acid content) of a 6% solution of sodium hydroxide, or other equivalent alkali solution, to remove the cumic acid as the alkali metal salt. The aqueous alkali extract is acidified with hydrochloric or other suitable acid to precipitate the cumic acid in crude form. The cumic acid is then filtered off. Alternatively, the aqueous solution may be decanted from the acid.

The acid thus recovered is then distilled to yield cumic acid as a distillate. Such cumic acid distillate has a yellow color, due to impurities, but after being crystallized twice from mineral spirits, toluene, alcohol or similar organic solvent, a pure product is obtained that melts from 116 to 117° C. and which, when analyzed as a monobasic acid, has a molecular weight of 164.0.

Other methods of recovery of the acid are equally satisfactory. For instance, the crude precipitated cumic acid can be dissolved directly in a solvent and crystallized therefrom. After a further recrystallization, a very pure product is obtained.

The remaining oil from the alkali extraction, after having had its cumic acid content removed, can be fractionally distilled and the unreacted cymene recovered for oxidation in a succeeding batch.

The time of oxidation can be considerably reduced if a small quantity, such as 10%, of the crude oxidation reaction mass of a previous run is added to a new batch to be oxidized. This assists in the activation of the catalyst, which, even at ordinary room temperatures, may become so active that with good agitation practically all of the oxygen of the air used is consumed in a single pass. Furthermore, the addition of some of a previous crude reaction mass to a new batch causes the reaction to take place rapidly at the lowest temperature, where the highest yield of cumic acid can be obtained. It is possible, although this is not well understood, that such unusual catalytic activity is associated with the presence of cumic acid, which may combine with the metal salts to form complex oxy-cumates or other compounds which are more soluble or more easily dispersed than the acetates.

As previously stated, similar catalytic effects can be produced by using other metal oxygen compounds or their organic salts, or combinations of them. Various combinations of manganese and cobalt, cobalt and lead, iron, nickel and copper, vanadium, chromium and mercury are effective.

The temperature of oxidation may be varied either way from the temperature of 30° C. specified in the foregoing example. At temperatures much below 30° C., the rate of acid formation becomes impracticably low. At temperatures above 30° C., the rate of acid formation becomes greater, but also the formation of other oxidation products of cymene becomes more marked, such that at about 140° C. practically no cumic acid is formed. Temperatures below 50° C. are preferred.

The cymene used as the starting material does not have to be pure. A solution of cymene and para-menthane can be used, or the cymene may be diluted with other solvents.

The extent to which the oxidation is carried in any given batch, as by controlling the rate of introduction of oxygen or the time of such introduction, may be varied over a considerable range. If a smaller proportion of the cymene is converted into cumic acid, then more cymene may be recovered for reoxidation in a subsequent run. Alternatively, the oxidation may be continued until practically no cymene remains unconsumed. Under the latter condition, however, cumic acid is likely to crystallize out.

The proportion of catalyst used may be varied, depending upon whether or not it is desired to speed up or slow down the oxidation. From a practical standpoint, however, the proportion of catalyst will, in general, lie within the range of from 0.1 to 5% of the weight of the charge.

Other methods of contacting air, or oxygen, with the cymene in the presence of an oxidizing catalyst are also effective in producing cumic acid. For example, the cymene may be sprayed into air and allowed to collect, the air replaced and the product resprayed until it is sufficiently oxidized. Alternatively, the cymene and catalyst may be caused to flow down through a partially filled or packed tower, up through which a stream of air is passed. So long as air, or oxygen, is brought into intimate contact with the cymene and catalyst, oxidation is effected. For the purposes of this specification and claims, air and oxygen are equivalent and are referred to generically as molecular oxygen.

Our invention, therefore, does not reside solely in the specific conditions that have been described above for carrying out the process, but resides broadly in the discovery that cymene can be oxidized in liquid phase by contact with molecular oxygen in the presence of a catalyst sufficiently active and selective in its action at temperatures below 140° C. to oxidize the methyl group of the cymene rather than the isopropyl group.

It will, of course, be understood that various details of the process may be varied through a wide range without departing from the principles of this invention and it is, therefore, not the purpose to limit the patent granted hereon otherwise than necessitated by the scope of the appended claims.

We claim as our invention:

1. The process of preparing oxidation products of a cymene which comprises continuing to subject a cymene in liquid phase to the action of molecular oxygen at a temperature sufficiently below 140° C. to insure the production of cumic acid, in the presence of an oxidation catalyst selected from the group consisting of oxides, hydroxides, and carboxylic acid salts of heavy metals, until a mixture of cumic acid, methyl acetophenone, and dimethyl tolyl carbinol has been produced, and separating cumic acid from said mixture.

2. The process of preparing oxidation products of cymene which comprises subjecting cymene in liquid phase to the action of molecular oxygen at a temperature above 30° C. but sufficiently below 140° C. to insure the production of cumic acid in the presence of an effective amount of an oxidation catalyst selected from the group consisting of the oxides, hydroxides, and carboxylic acid salts of heavy metals, thereby producing a mixture of cumic acid, methyl acetophenone, and dimethyl tolyl carbinol, and recovering cumic acid separate from said mixture.

3. The method of preparing oxidation products of a cymene which comprises subjecting cymene in liquid phase to the action of molecular oxygen at a temperature sufficiently below 140° C. to insure the production of cumic acid in the presence of an oxidation catalyst containing mixed heavy metal compounds selected from the group consisting of oxides, hydroxides, and carboxylic acid salts of heavy metals, until a reaction mass containing a mixture of cumic acid, methyl acetophenone, and dimethyl tolyl carbinol has been produced, and removing cumic acid from the reaction mass.

4. The method of preparing oxidation products of a cymene which comprises subjecting cymene in liquid phase to the action of molecular oxygen at a temperature sufficiently below 140° C. to insure the production of cumic acid in the presence of an oxidation catalyst containing mixed lead and manganese compounds selected from the group consisting of oxides, hydroxides, and carboxylic acid salts of said metals until a reaction mass containing a mixture of cumic acid, methyl acetophenone, and dimethyl tolyl carbinol has been produced, and recovering cumic acid from the reaction mass.

5. The method of preparing oxidation products of a cymene which comprises subjecting cymene in liquid phase to the action of molecular oxygen at a temperature sufficiently below 140° C. to insure the production of cumic acid in the presence of a lead-manganese cumate oxidation catalyst until a reaction mass containing a mixture of cumic acid, methyl acetophenone, and dimethyl tolyl carbinol has been produced, and removing cumic acid from the reaction mass.

6. The method of preparing oxidation products of a cymene which comprises subjecting cymene in liquid phase at a temperature sufficiently below 140° C. to insure the production of cumic acid in the presence of an oxidation catalyst selected from the group consisting of oxides, hydroxides, and carboxylic acid salts of heavy metals and in the presence of a cymene oxidation product from a previous similar run, until a reaction mass containing a mixture of cumic acid, methyl acetophenone, and dimethyl tolyl carbinol has been produced, and recovering cumic acid from the reaction mass.

7. The process of preparing oxidation products of a cymene which comprises subjecting a cymene in liquid phase at a temperature between 30° and 50° C. to the action of molecular oxygen in the presence of an oxidation catalyst selected from the group consisting of the oxides, hydroxides, and carboxylic acid salts of heavy metals until a reaction mass containing a mixture of cumic acid, methyl acetophenone, and dimethyl tolyl carbinol has been produced, and recovering cumic acid from the resulting reaction mass.

8. The process of preparing oxidation products of a cymene which comprises subjecting a cymene in liquid phase at a temperature sufficiently below 140° C. to insure the production of cumic acid to the action of molecular oxygen in the presence of an oxidation catalyst selected from the group consisting of the oxides, hydroxides, and carboxylic acid salts of heavy metals, until a reaction mixture of cumic acid, methyl acetophenone, and dimethyl tolyl carbinol has been produced, washing the reaction mixture with an acid aqueous medium to remove the catalyst, then washing the reaction mixture with an alkaline aqueous medium to remove the cumic acid as a soluble cumate, acidifying the resulting solution to recover crude cumic acid from said soluble cumate, and purifying said crude cumic acid.

9. The process of preparing oxidation products of a cymene which comprises subjecting cymene in liquid phase to the action of molecular oxygen at a temperature of between 30 and 50° C. in the presence of an oxidation catalyst containing mixed lead and manganese compounds selected from the group consisting of oxides, hydroxides, and carboxylic acid salts of said metals until a reaction mass containing a mixture of cumic acid, methyl acetophenone, and dimethyl tolyl carbinol has been produced, and recovering cumic acid from such reaction mass.

ROBERT C. PALMER.
CARLISLE H. BIBB.